United States Patent
Wing et al.

(10) Patent No.: US 7,472,411 B2
(45) Date of Patent: Dec. 30, 2008

(54) METHOD FOR STATEFUL FIREWALL INSPECTION OF ICE MESSAGES

(75) Inventors: Daniel G. Wing, San Jose, CA (US); Robert T. Bell, Bountiful, UT (US)

(73) Assignee: Cisco Technology, Inc., San Jose, CA (US)

(*) Notice: Subject to any disclaimer, the term of this patent is extended or adjusted under 35 U.S.C. 154(b) by 149 days.

(21) Appl. No.: 11/265,596

(22) Filed: Nov. 1, 2005

(65) Prior Publication Data

US 2007/0101414 A1      May 3, 2007

(51) Int. Cl.
   G06F 21/00      (2006.01)
(52) U.S. Cl. .............................. 726/5; 726/4; 713/151; 713/155; 713/162
(58) Field of Classification Search ................ 726/4, 726/5, 12, 13; 713/151, 155, 162
   See application file for complete search history.

(56) References Cited

U.S. PATENT DOCUMENTS

| 6,865,681 | B2 * | 3/2005 | Nuutinen ................. 726/14 |
| 2003/0061506 | A1 | 3/2003 | Cooper et al. |
| 2004/0098619 | A1 | 5/2004 | Shay |
| 2007/0124687 | A1 * | 5/2007 | Wing et al. ............... 715/741 |

OTHER PUBLICATIONS

Rosenberg et al., STUN—Simple Traversal of User Datagram Protocol (UDP) Through Network Address Translators, Network Working Group Request for Comments (IETF RFC) 3489, Mar. 2003.*

Rosenberg: Interactive Connectivity Establishment (ICE): A Methodology for Network Address Translator (NAT) Traversal for Offer/Answer Protocols, IETF Internet Draft, Jul. 16, 2005.*

Jennings et al., NAT Classification Test Results, BEHAVE Working Group, IETF Internet Draft, Aug. 14, 2005.*

J. Rosenberg, http://www.ietf.org/internet-drafts/draft-ietf-mmusic-ice-06.txt, Oct. 19, 2005, 49 pages.

J. Rosenberg, http://www.ietf.org/internet-drafts/draft-ietf-mmusic-ice-05.txt, Jul. 17, 2005, 45 pages.

J. Rosenberg, http://www.jdrosen.net/papers/draft-rosenberg-mmusic-rtp-denialofservice-00.txt, Jun. 23, 2003, 13 pages.

International Searching Authority, International Search Report and Written Opinion, International Application No. PCT/US2006/026651, Nov. 7, 2006, pp. 3-10, International Searching Authority, European Patent Office.

(Continued)

Primary Examiner—Emmanuel L Moise
Assistant Examiner—Paul Callahan
(74) Attorney, Agent, or Firm—Stolowitz Ford Cowger LLP

(57) ABSTRACT

An endpoint uses Interactive Connectivity Establishment (ICE) to enable multimedia communications to traverse Network Address Translators (NATs). A security policy enables security devices and asymmetric security devices to forward ICE messages. A management device stores information about an initial message. Later, a security device receives an ICE message and sends and authorization request to the management device. The management device compares information in the authorization request to information in memory. According to the comparison, the management device authorizes the security device to forward the ICE message.

25 Claims, 16 Drawing Sheets

OTHER PUBLICATIONS

Aoun, et al., NATFirewall NSLP Migration and Intra-Realm Communication Considerations, draft-aoun-nsis-nslp-natfw-migration-00, Internet Draft, Oct. 20, 2003, pp. 1-31, NSIS Working Group.

J. Rosenberg et al., "STUN—Simple Transversal of User Datagram Protocol (UDP) Through Network Address Translators (NATs)," Network Working Group, Request for Comments (RFC) 3489, Mar. 2003, 44 pages.

J. Rosenberg, "Interactive Connectivity Establishment (ICE): A methodology for Network Address Translator (NAT) Transversal for Offer/Answer Protocols," draft-ietf-mmusic-ice-05, Jul. 17, 2005, 45 pages.

C. Jennings, "NAT Classification Test Results," draft-jennings-behave-test-results-00, IETF Internet Draft, Feb. 13, 2005, 11 pages.

M. Baugher, et al., The Secure Real-Time Transport Protocol (SRTP), Mar. 2004, p. 1-39.

V. Hilt, et al., A Delivery Mechanism for Session-Specific Session Initiation Protocol (SIP) Session Policies, Jul. 12, 2005, p. 1-14.

V. Hilt, et al., A Framework for Session Initiation Protocol (SIP) Session Policies, Oct. 16, 2005, p. 1-18.

\* cited by examiner (BACKGROUND)

(BACKGROUND)

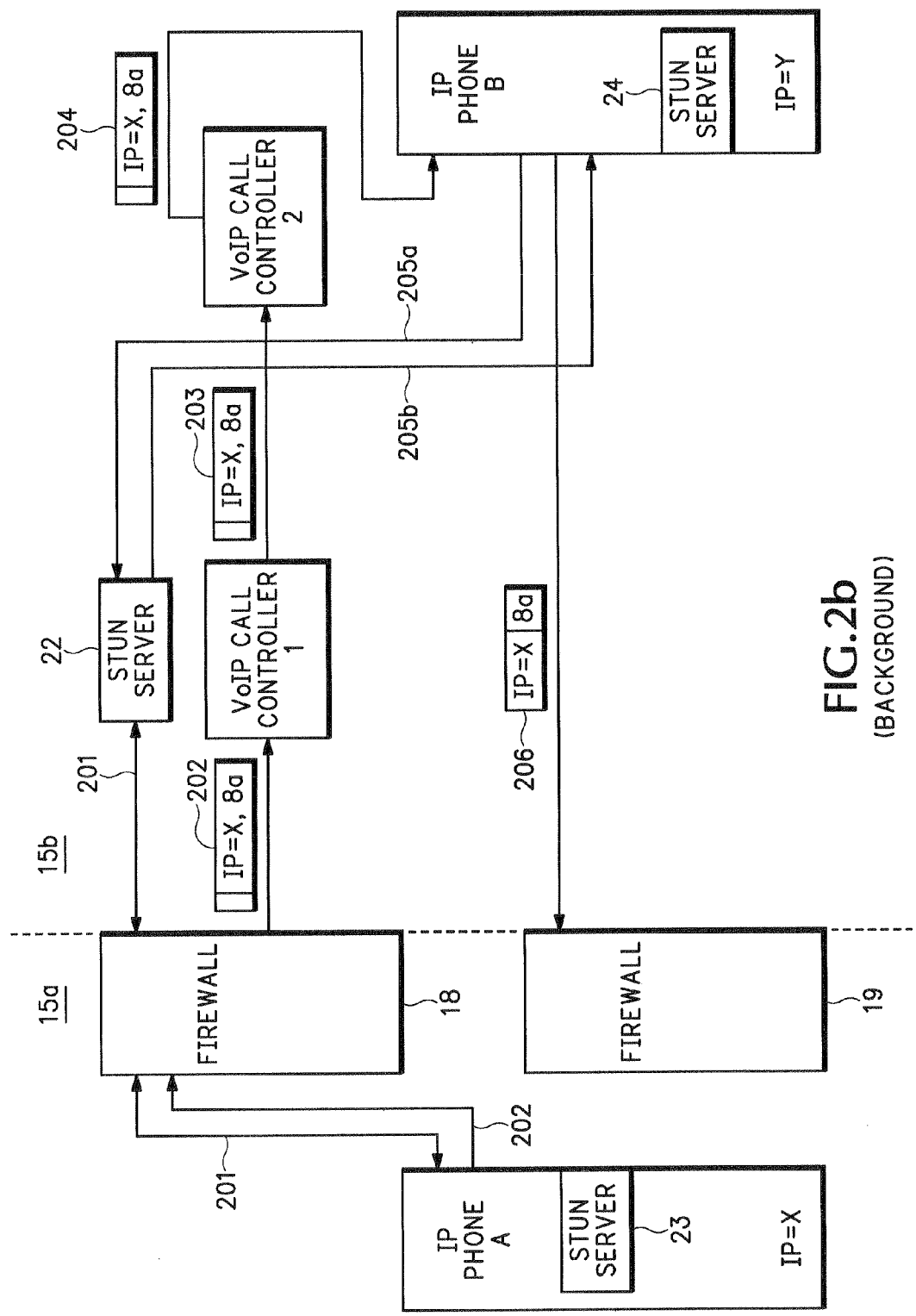
FIG.2b (BACKGROUND)

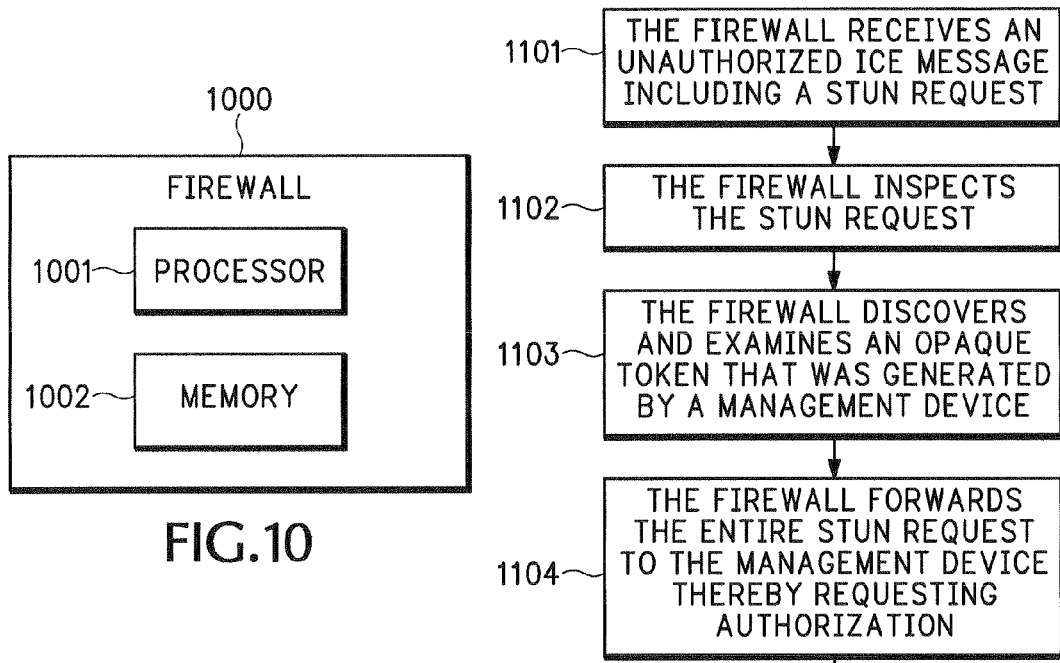

METHOD FOR STATEFUL FIREWALL INSPECTION OF ICE MESSAGES

BACKGROUND OF THE INVENTION

This invention relates generally to Interactive Connectivity Establishment (ICE) and more particularly to using ICE across restrictive security boundaries such as restrictive Network Address Translator (NAT) boundaries or firewalls.

Endpoints such as Internet Protocol (IP) phones can make multimedia communications such as Voice over IP (VoIP) calls using multimedia session signaling protocols such as Session Initial Protocol (SIP). Devices such as NATs located between two endpoints can prevent the flow of multimedia session signaling protocol messages between the two endpoints. ICE was developed to allow multimedia communications to operate through NATs.

Even though ICE was developed to allow multimedia communications to operate through NATs, ICE is generally used before any multimedia communications whether or not NATs are located between two communicating endpoints. ICE is used because an endpoint is generally unaware of how many, if any, NATs are located between itself and another endpoint.

FIG. 1 shows IP phones A and B utilizing ICE to communicate using multimedia session signaling protocol. For simplification, an example is shown where there are no NATs located between IP phones A and B.

IP phone A first utilizes any method available to determine what IP addresses and port combinations that are used for receiving media streams. In this instance, IP phone A uses Simple Traversal of User Datagram Protocol (UDP) Through NATs (STUN). The STUN communications 101 are used with a STUN server 22 to determine the IP address X and UDP port number for IP phone A (IP=X). IP phone A then makes a local STUN server 23 available on itself and associates a unique identifier 8a with that IP address X. As defined by ICE, the unique identifier 8a is generated by combining random bit values with media level attributes.

Next, IP phone A sends call request 102 including IP address X and the unique identifier 8a to a call controller 1. In this example the IP phone A is making a VoIP communication, and therefore, the call controller 1 is a VoIP call controller. VoIP call controller 1 sends call request 103 including IP address X and unique identifier 8a to VoIP call controller 2 for IP phone B. VoIP call controller 2 sends a call request 104 to IP phone B that includes IP address X and unique identifier 8a After receiving call request 104, IP phone B may use any method to determine what IP addresses and port combinations may be used to receive media streams. In this example, IP phone B also uses STUN. STUN request 105a is sent to STUN server 22 to determine the IP address Y and UDP port number for IP address Y (IP=Y) for IP phone B.

Also after the call request 104 is received, and generally in parallel with the STUN request 105a, IP phone B sends a STUN request 106 to the STUN server 23. The purpose of the STUN request 106 is for IP phone B to verify that it can reach IP phone A at IP address X. Included in the STUN request 106 is the unique identifier 8a.

IP phone A receives STUN request 106 and verifies the unique identifier 8a before sending back a STUN response 107. The STUN response 107 is shown to arrive before the accept message 108 is sent, however depending on network characteristics, the STUN response 107 may instead arrive at a later time as indicated by dashed line 107.

After receiving STUN response 105b back from the STUN server 22, IP phone B makes a local STUN server 24 available on IP address Y and associates a unique identifier 8b with that IP address Y. Also after receiving STUN response 105b, IP phone B sends an accept message 108 to IP phone A. The accept message 108 also includes the IP address Y and the unique identifier 8b. The accept message 108 may be sent before the STUN response 107 is received as indicated by dashed line 107.

After receiving the accept message 108, IP phone A sends a STUN request 109 to STUN server 24 to verify that it can reach IP phone B at IP address Y. Included in the STUN request 106 is the unique identifier 8b. IP phone B receives the STUN request 109 and sends a STUN response 110 after optionally verifying the unique identifier 8b. Media communications 111 begin after IP phones A and B verify that they can communicate with each other as described above.

FIG. 2a shows how ICE operates with a device 11 that restricts the flow of communications to and from IP phone A. In this example, device 11 is a restrictive firewall that restricts the flow of inbound and outbound communications with devices that are not included on an "always permitted" list 12 (hereinafter referred to as list 12). In other examples device 11 is a restrictive NAT 11. The device 11 restricts more communications than a conventional NAT. For example, a conventional NAT does not restrict inbound communications from IP addresses that IP phone A has used to send outbound communications.

ICE begins normally with IP phone A first sending a STUN request 201a to STUN server 22. Firewall 11 forwards the STUN request 201a and associated STUN response 201b because the associated address is on the list 12. IP phone A then makes local STUN server 23 available on IP address X and associates a unique identifier 8a with that IP address X.

Next, IP phone A sends call request 202 to VoIP call controller 1. Firewall 11 forwards the call request 202 because to the associated address for the VoIP call controller 1 that is included on the list 12. VoIP call controller 1 sends a corresponding call request 203 to VoIP call controller 2 for IP phone B. VoIP call controller 2 sends a corresponding call request 204 to IP phone B.

After receiving call request 204, IP phone B sends STUN request 205a. IP phone B also sends a STUN request 206 to the STUN server 23, which is intercepted by firewall 11. Because IP phone B is not on the list 12, the STUN request 206 is dropped and not received by IP phone A.

IP phone B does however receive STUN response 205b back from STUN server 22. Accordingly, IP phone B makes a local STUN server 24 available on IP address Y and associates a unique identifier 8b with that IP address Y. Because firewall 11 intercepts and drops the STUN request 206, ICE cannot be completed and multimedia communications cannot be transferred between IP phones A and B.

FIG. 2b shows the IP phone A located behind asymmetric firewalls 18 and 19. Firewalls 18 and 19 are asymmetric because outbound communications are received at one firewall 18, while inbound communications are received at another firewall 19. This asymmetric routing occurs due to normal asymmetric IP routing in network 15a and network 15b. Firewalls 18 and 19 have the same policy restrictions as conventional NATs in that they only restrict the flow of inbound communications. Thus, in this example the asymmetric firewalls 18 and 19 have a much less restrictive security policy than the previously described firewall 13.

ICE begins normally with STUN communications 201 exchanged with STUN server 22 to determine the IP address X and UDP port number for IP address X for IP phone A. IP phone A then makes local STUN server 23 available on IP address X and associates unique identifier 8a with the local STUN server 23.

Next, IP phone A sends call request 202 to a VoIP call controller 1. Because it is an outbound communication, firewall 18 forwards the call request 202 to VoIP call controller 1. VoIP call controller 1 sends call request 203 to VoIP call controller 2, which sends call request 204 to IP phone B.

After receiving the call request 204, IP phone B sends the STUN request 205a to STUN server 22. IP phone B also sends a STUN request 206 to the STUN server 23. Firewall 19 has not previously forwarded outbound communications to IP phone B, and thus STUN request 206 is dropped.

As a result of receiving STUN response 205b back from STUN server 22, IP phone B makes local STUN server 24 available on the IP address Y and associates a unique identifier 8b with that IP address Y. Because firewall 19 intercepted and dropped the STUN request 206, ICE cannot be completed and multimedia communications cannot be transferred between IP phones A and B.

Because of the forgoing limitations, endpoints behind restrictive firewalls and restrictive NATs are unable to establish multimedia communications. Endpoints located behind asymmetric firewalls of varying security policies are also unable to establish multimedia communications. The disclosure that follows solves this and other problems.

SUMMARY OF THE INVENTION

An endpoint uses Interactive Connectivity Establishment (ICE) to enable multimedia communications to traverse Network Address Translators (NATs). A security policy enables security devices and asymmetric security devices to forward ICE messages. A management device stores information about an initial message. Later, a security device receives an ICE message and sends and authorization request to the management device. The management device compares information in the authorization request to information in memory. According to the comparison, the management device authorizes the security device to forward the ICE message.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 2B is a diagram of ICE failing with asymmetric firewalls.

FIG. 10 is a diagram of the firewall shown in FIGS. 3A and 3B.

FIG. 11 is a flowchart showing how the firewall receives authorization to forward of ICE messages.

DETAILED DESCRIPTION

Figure 1:
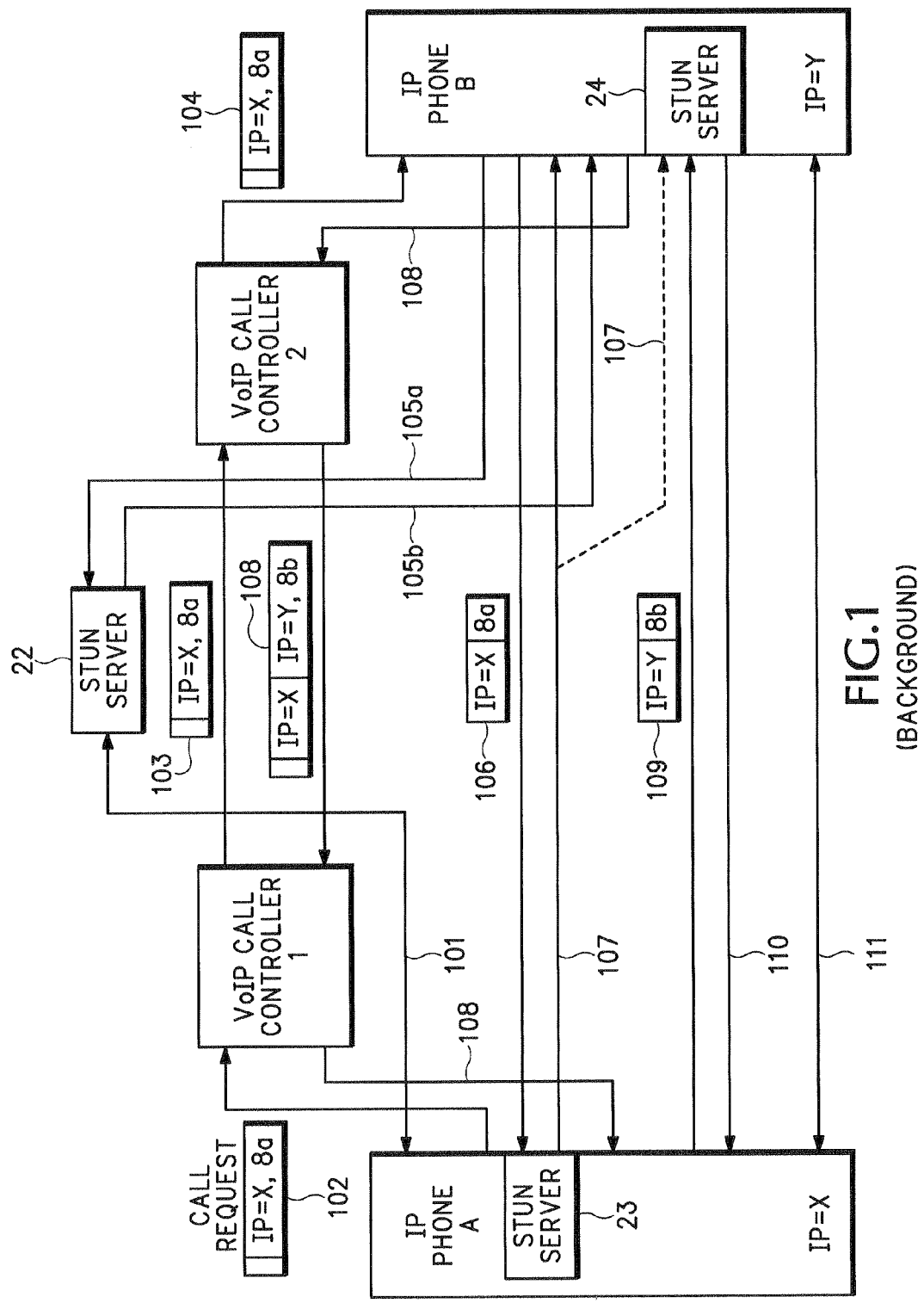
FIG. 1 is a diagram showing the ICE protocol.
Figure 2A:
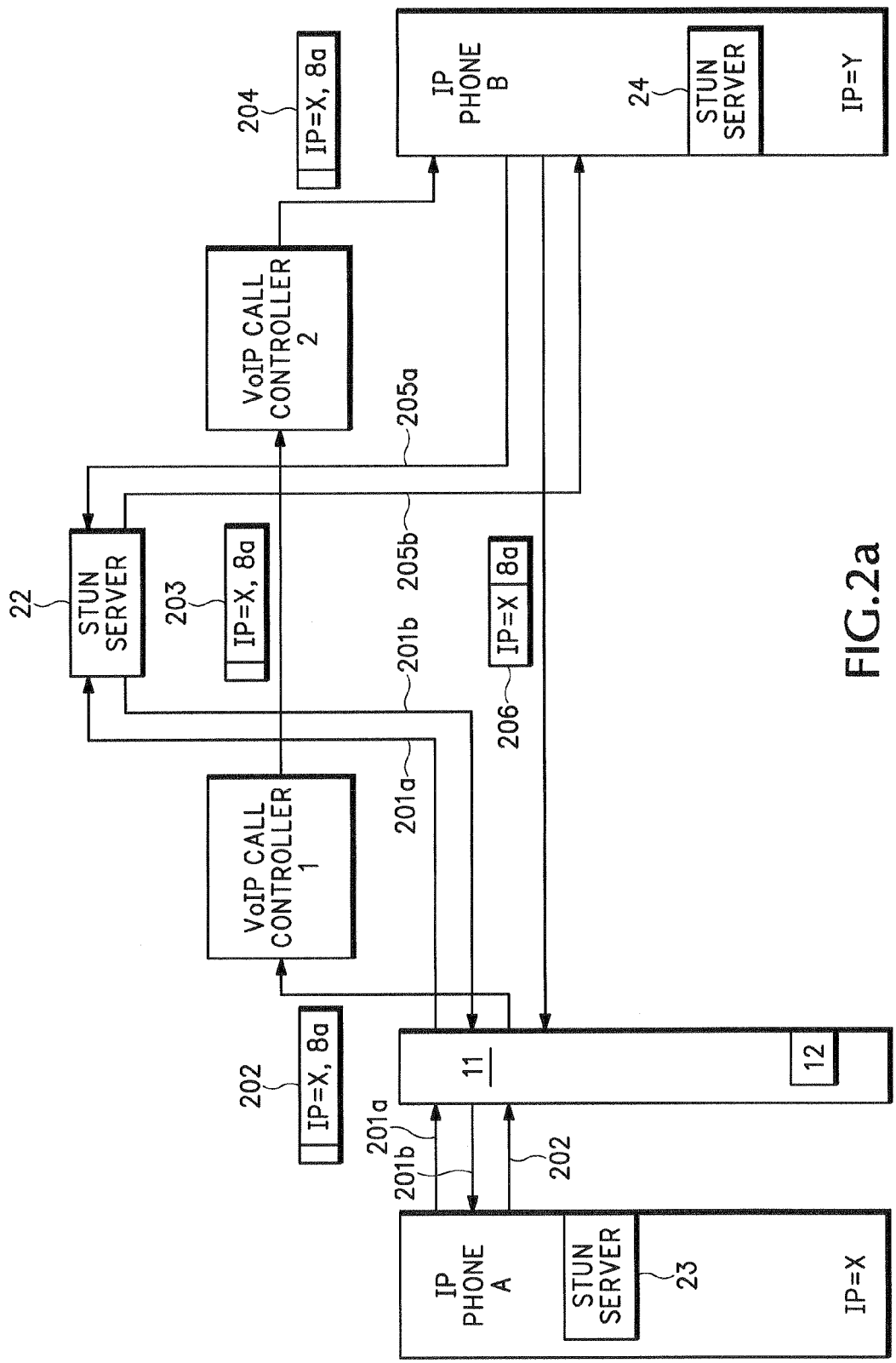
FIG. 2A is a diagram of ICE failing with a firewall.
Figure 3A:
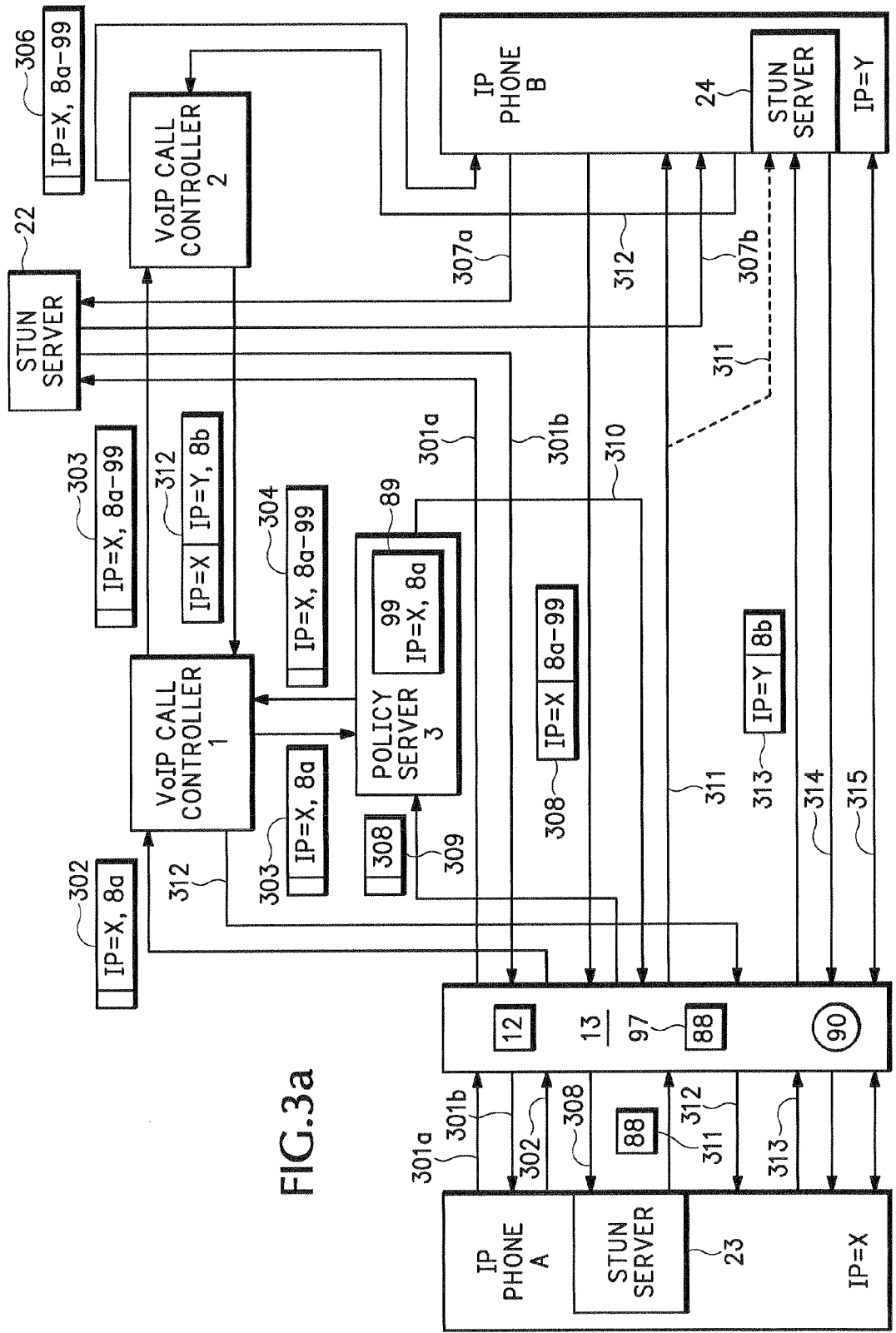
FIG. 3A is a diagram showing one example of a policy server authorizing a firewall to forward ICE messages.

FIG. 3a shows one example of the present application that allows ICE to operate even though IP phone A is located behind a firewall 13. ICE is described in draft-ietf-mmusic-ice-05.txt which is herein incorporated by reference and which may be found on the Internet Engineering Task Force (IEFT) website. The call controller 1 operates with VoIP calls but could be any type of control system. The policy server 3 is any management device 3 that manages security devices for IP phone A. The firewall 13 may be a restrictive NAT or any other security device that restricts inbound communications including those from IP addresses to which firewall 13 previously forwarded outbound communications.

ICE begins normally with IP phone A first sending STUN request 301a to the STUN server 22. Because there is an entry for STUN server 22 on list 12, firewall 13 forwards the STUN request 301a and the STUN response 301b. IP phone A then makes local STUN server 23 available on IP address X and associates a unique identifier 8a with that IP address X.

Next, IP phone A sends call request 302 to VoIP call controller 1 that includes IP address X and the unique identifier 8a. Firewall 13 forwards the call request 302 because there is an entry for VoIP call controller 1 on list 12.

After receiving call request 302, VoIP call controller 1 sends contact information 303 to the policy server 3. In the present example the contact information 303 includes IP address X and the unique identifier 8a. In other examples a greater number of pairs of IP address and port combinations and associated unique identifiers may be provided. Also, in other examples an associated bandwidth value may also be communicated to the policy server 3. An associated bandwidth value helps to identify denial of service attacks by letting the policy server 3 know in advance how much bandwidth associated response signals should be using.

Figure 4:
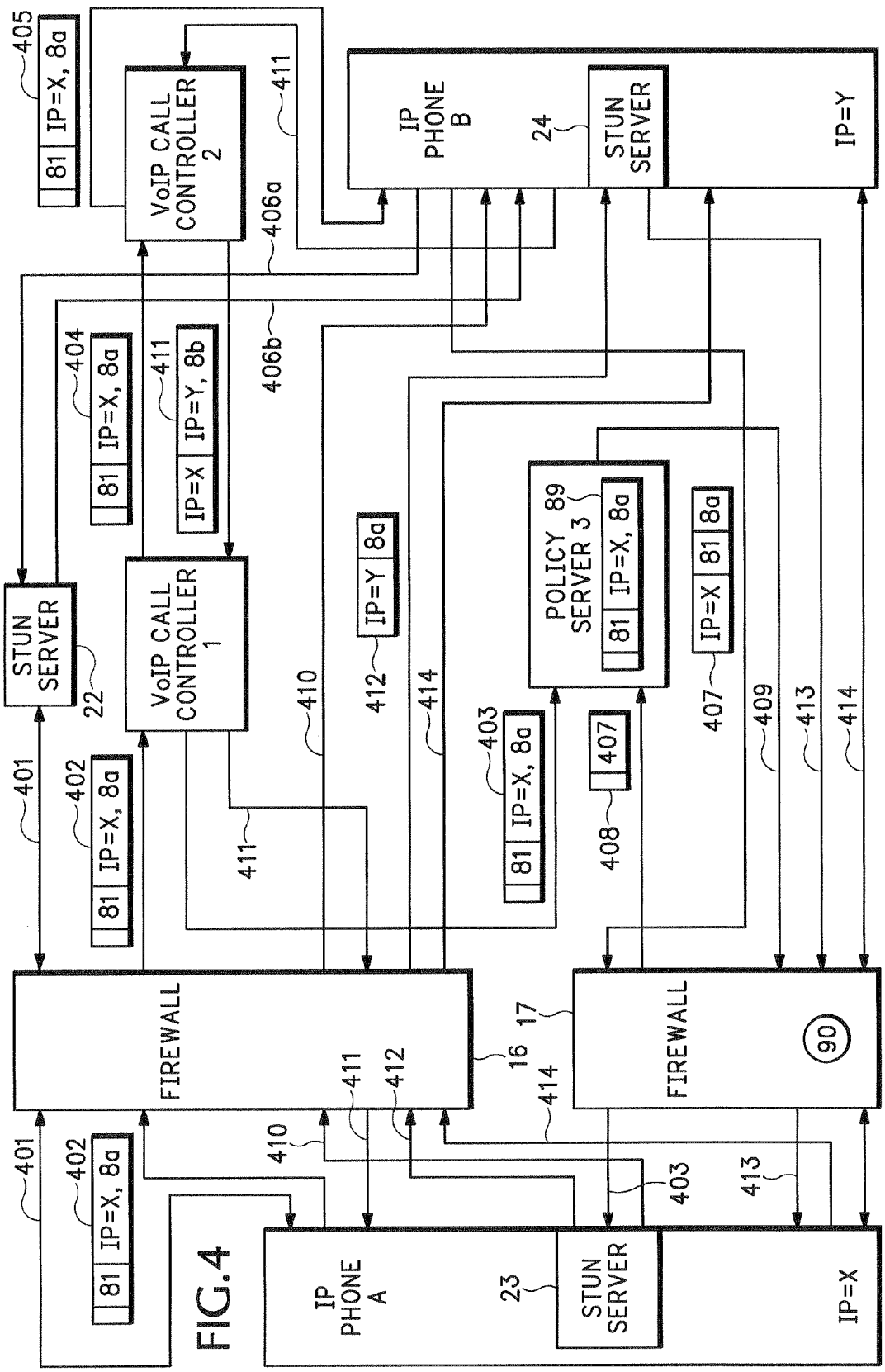
FIG. 4 is a diagram showing a policy server authorizing asymmetric firewalls to forward ICE messages.
Figure 5:
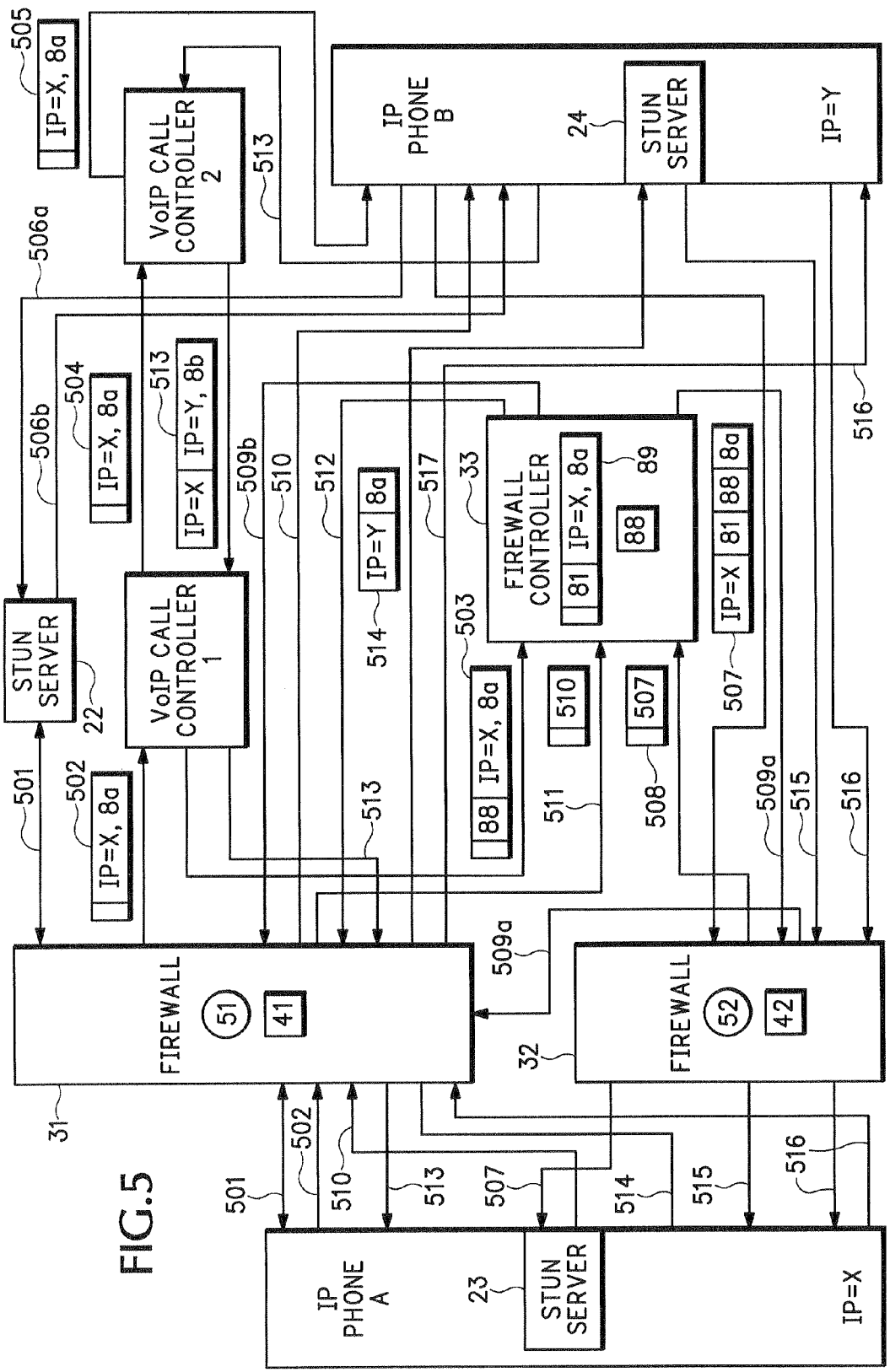
FIG. 5 is a diagram showing a firewall controller authorizing asymmetric restrictive firewalls to forward ICE messages.

After receiving the contact information 303 in this example the policy server 3 generates an opaque token 99. The use of opaque token 99 is optional and provides scaling benefits for improved management when several security devices are included in a network. In the present example opaque token 99 is a 64-bit number that is meaningless to all devices except policy server 3 and firewall 13. Policy server 3 advantageously prepends or appends the opaque token 99 to the unique identifier 8a. Instead of prepending or appending, the opaque token may be added as a header in the signaling message 305. However, one advantage of including the opaque token as part of the unique identifier rather than as a header is that IP phone B does not need to remove the opaque token from a signaling message and include it in a STUN request. In other examples tokens are not used. For example, a token is not required as shown in FIGS. 4 and 5.

Referring back to FIG. 3a, the policy server 3 also examines values of the IP address X and the unique identifier 8a and stores those values together with opaque token 99 in a memory 89. Then the policy server 3 sends a communication 304 back to the VoIP call controller 1 that includes IP address X and the unique identifier 8a including the opaque token 99. After receiving the communication 304, the VoIP call controller 1 sends the call request 305 to VoIP call controller 2. VoIP call controller 2 sends the call request 306 to IP phone B.

After receiving the call request 306, IP phone B determines what IP addresses and port combinations to receive associated multimedia streams. In this example, IP phone B then sends STUN request 307a to STUN server 22. Generally in parallel with STUN request 307a, IP phone B sends STUN request 308 to IP phone A. STUN request 308 includes unique identifier 8a including opaque token 99.

Firewall 13 intercepts the STUN request 308 and examines the opaque token 99 included in the unique identifier 8a. Based on the value of the opaque token 99, firewall 13 determines that STUN request 308 is associated with policy server 3. Accordingly, firewall 13 sends a message 309 containing the entire STUN request 308 to policy server 3.

Policy server 3 compares a value of unique identifier 8a including opaque token 99 in STUN request 308 to a value in memory 89. Since the values match, policy server 3 strips the opaque token 99 from the unique identifier 99 and sends an authorization 310 to firewall 13.

The firewall 13 examines the STUN request 308 to determine a STUN transaction ID 88. A STUN transaction ID 88 is included as a header in STUN communications. After storing the STUN transaction ID 88 in a memory 97 and receiving authorization 310, the firewall 13 forwards the STUN request 308 to IP phone A. The firewall 13 then monitors for a non-error STUN response 311 with a same STUN transaction ID 88. After the firewall detects a non-error STUN response 311 with the same STUN transaction ID 88, the firewall 13 opens a pinhole 90 permitting all communications to the IP address in STUN request 308. A pinhole 90 is a path through a firewall; through which a flow associated with a particular IP address may pass. Thus, the firewall 13 leverages the unique identifier 8a check made at IP phone A as a second verification.

In this example, the firewall 13 then forwards STUN response 311 based on the pinhole 90. The STUN response 311 arrives at IP phone B before the accept message 312 is sent. However, depending on network characteristics, the accept message 312 may be sent before STUN response 311 is received. It will become apparent why this is noted in the detailed description of FIG. 3b.

After IP phone B receives STUN response 307b, the IP phone B then makes a local STUN server 24 available on IP address Y and associates a unique identifier 8b with that IP address Y. Also after receiving STUN response 307b, IP phone B sends an accept message 312 including the IP address Y and the unique identifier 8b. The accept message 312 may be sent before the STUN response 311 is received as indicated by dashed line 311. The firewall 13 forwards the accept message 312 because VoIP controller 1 is included on list 12.

After receiving the accept message 312, IP phone A sends a STUN request 313 to the STUN server 24 to verify that it can reach IP phone B at IP address Y. Included in the STUN request 313 is the unique identifier 8b. IP phone B receives the STUN request 313 and sends a STUN response 314 after optionally verifying the unique identifier 8b. IP phone A has thus verified that it can reach IP phone B at a particular address and visa versa and media communications 315 may begin.

Figure 3B:
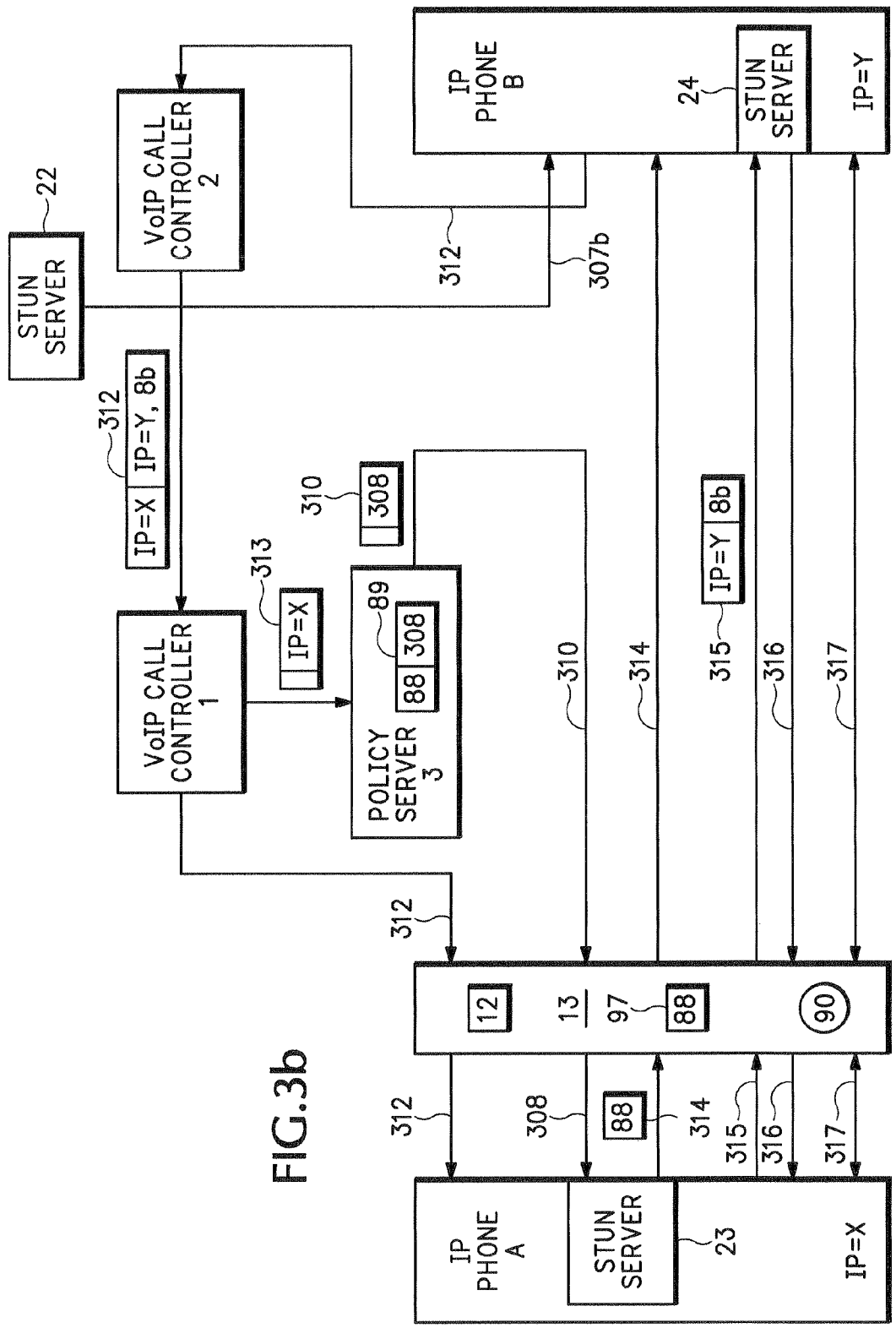
FIG. 3B is a diagram showing a second example of the firewall in FIG. 3A.

FIG. 3b shows a second example that includes an additional security feature. The operations are the same as the example shown in FIG. 3a until policy server 3 is ready to send authorization 310 for STUN request 308 to firewall 13. At that point, instead of immediately sending authorization 310, policy server 3 stores both the entire STUN request 308 and the STUN transaction ID 88 in the memory 89.

Next, after receiving STUN response 307b, IP phone B sends accept message 312 to IP phone A through the signaling path to be received by VoIP call controller 1. After receiving accept message 312, instead of just forwarding accept message 312 to IP phone A, VoIP call controller 1 also determines the source IP address X. VoIP call controller 1 then sends communication 313 including the source IP address X of the accept message 312 to policy server 3. Alternatively, instead of determining the source IP address X itself, VoIP call controller 1 may instead send a copy of accept message 312 in communication 313 for determination by policy server 3.

After receiving communication 313, policy server 3 compares the received source IP address X to a source IP address X for STUN request 308. After verifying a match, policy server 3 finally sends authorization 310 including the entire STUN request 308 to firewall 13. Policy server 3 also strips the opaque token 99 from the STUN request 308 before sending it to firewall 13.

After receiving authorization 310, firewall 13 forwards STUN request 308 to IP phone A and stores the STUN transaction ID 88 in memory 89. A benefit of waiting to store the STUN transaction ID 88 until after the authorization 310 is that firewall 13 is protected from denial of service attacks. A malicious person sending false or irrelevant STUN requests is prevented from filling up the memory 97 with irrelevant STUN transaction IDs.

The firewall 13 then monitors for a non-error STUN response 314 with a same STUN transaction identification 88. If the firewall 13 detects a non-error STUN response 314 with the same STUN transaction identification 88, the firewall 13 opens a pinhole 90 permitting all communications to and from IP phone B. The firewall 13 then forwards STUN response 314 based on the pinhole 90.

Next, IP phone A sends a STUN request 315 to the STUN server 24 to verify that it may reach IP phone B at IP address Y. IP phone B receives the STUN request 315 and sends a STUN response 316 after optionally verifying the unique identifier 8b. IP phone A has thus verified that it may reach IP phone B at a particular address and visa versa and media communications 317 may begin.

Referring now to FIG. 4, an example is shown where IP phone A is behind asymmetric firewalls 16 and 17. Firewalls 16 and 17 restrict the flow of inbound communications but generally allow outbound communications. Firewalls 16 and 17 will, however, allow inbound communications from IP addresses that IP phone A has used to send outbound communications. Thus firewalls 16 and 17 are less restrictive than the firewall 13 that was previously described.

ICE begins normally with IP phone A making STUN communications 401 with STUN server 22. The IP phone A then makes a local STUN server 23 available on IP address X and associates a unique identifier 8a with that IP address X.

Next, IP phone A sends call request 402. The ICE protocol includes media information 81 in all call requests 402. Thus call request 402 includes a header with the media information 81 in addition to the payload including IP address X and the unique identifier 8a. To avoid repetition, it will no longer be specifically indicated whether a particular message includes an IP address and a unique identifier. Firewall 16 forwards call request 402 because it is an outbound communication to VoIP call controller 1.

VoIP call controller 1 receives call request 402. After recognizing that the message 402 is a call request, VoIP call controller 1 sends a message 403 including the media information 81 to policy server 3. Policy server 3 stores in a memory 89 the media information 81, the IP address X and the unique identifier 8a. Also after receiving call request 402, VoIP call controller 1 sends call request 404 to VoIP call controller 2.

After IP phone B receives call request 405, IP phone B utilizes any method to determine which IP addresses and port combinations can receive multimedia streams. In this example, IP phone B sends STUN request 406a. IP phone B also sends STUN request 407 to IP phone A. STUN request 407 includes a header with the media information 81.

Firewall 17 intercepts the STUN request 407 and determines that the source is IP address Y. Firewall 17 determines that it has not forwarded outgoing communications to IP address Y. As a result, firewall 17 sends a message 408 including the entire STUN request 407 to policy server 3.

After receiving message 408, policy server 3 compares a value of the media information 81 located in STUN request 407 to a value stored in memory 89. Policy server 3 may also compare a value of the unique identifier 8a located in STUN request 407 to a value stored in memory 89. Since both the values match, policy server 3 sends an authorization 409 to firewall 17. Firewall 17 receives the authorization 409, opens a pinhole 90 and forwards the STUN request 407 to IP phone A.

After receiving STUN request 407, IP phone A sends STUN response 410 to IP phone A. Firewall 16 forwards STUN response 410 because it is an outbound communication.

After IP phone B receives the STUN response 406b from STUN server 22, the IP phone B then makes a local STUN server 24 available on IP address Y and associates a unique identifier 8b with that IP address Y. Also after receiving STUN response 406b, IP phone B sends an accept message 411. Firewall 13 forwards the accept message 411 because it was from VoIP call controller 1.

After receiving the accept message 411, IP phone A sends a STUN request 412 to the STUN server 24. IP phone B receives the STUN request 412 and sends a STUN response 413 after optionally verifying the unique identifier 8b. IP phone A has thus verified that it may reach IP phone B at a particular address and visa versa and media communications 414 may begin.

Referring now to FIG. 5 an example including asymmetric firewalls 31 and 32 is shown. Firewalls 31 and 32 have restrictive policies; they generally only allow communications to and from addresses on respective "always permitted" lists 41 and 42.

ICE begins normally with IP phone A making STUN communications 501 with STUN server 22 included on the list 41. The IP phone A then makes a local STUN server 23 available on IP address X and associates a unique identifier 8a with that IP address X. Next, IP phone A sends call request 502 with a header including media information. Firewall 31 forwards call request 502 because it is addressed to the VoIP call controller 1 included on the list 41.

VoIP call controller 1 receives call request 502. After recognizing that the message 502 is a call request, VoIP call controller 1 sends a message 503 including the media information 81 to firewall controller 33. Firewall controller 33 stores in a memory 89 the media information 81, the IP address X and the unique identifier 8a. Also after receiving call request 502, VoIP call controller 1 sends call request 504 to VoIP call controller 2.

After IP phone B receives the call request 505, IP phone B utilizes any method to determine which IP addresses and port combinations can receive multimedia streams. In this example, IP phone B sends STUN request 506a. IP phone B also sends STUN request 507 to IP phone A. STUN request 507 includes media information 81 and STUN transaction 88 as headers.

Firewall 32 intercepts STUN request 507 and determines the source. Since IP phone B is not on the list 42, firewall 32 sends a message 508 including the entire STUN request 507 to policy server 3.

After receiving message 508, firewall controller 33 stores the STUN transaction ID 88 in memory 89. Firewall controller 33 also compares a value of media information 81 located in STUN request 507 to a value stored in memory 89. Firewall controller 33 may also compare a value of the unique identifier 8a located in STUN request 507 to a value stored in memory 89. Since the values match, firewall controller 33 sends an authorization 509A to firewall 32. Optionally, firewall controller 33 may also broadcast a message 509B authorizing firewall 31 to forward a STUN response 510 with STUN transaction ID 88.

After receiving the authorization 509A, in this example the firewall 32 forwards the STUN request 507 to IP phone A. Firewall 32 also opens a pinhole 52. Optionally, the firewall 32 may also forward message 509B to firewall 31 thereby relieving firewall 31 from having to request authorization from firewall controller 33 concerning an outgoing message with STUN transaction 88. In larger networks, firewall 32 may multicast message 509B to all other firewalls in its multicast group.

After receiving STUN request 507, IP phone A sends STUN response 510 to IP phone A, which is intercepted by firewall 31. Firewall 31 determines that STUN response 510 is addressed to IP phone B that is not included on list 41. If firewall 31 previously received authorization 509B, it is determined whether STUN response 511 has a same STUN transaction ID 88. If so, STUN response 511 is forwarded to IP phone B and pinhole 51 is opened.

If authorization 509B was not received, firewall 31 sends an authorization request 511 including the entire STUN response 510. Firewall controller 33 examines the STUN response 510 and may compare values of the media information 81, the STUN transaction ID 88 and/or the unique identifier 8a located in STUN response 510 with values stored in memory 89. After determining a match, firewall controller 33 sends authorization 512 to firewall 31. Firewall 31 then forwards STUN response 510 to IP phone B and opens pinhole 51.

Meanwhile, IP phone B receives STUN response 506b and makes a local STUN server 24 available on IP address Y with an associated unique identifier 8b. Also after receiving STUN response 506b, IP phone B sends an accept message 513. The firewall 31 forwards the accept message 513 based on the pinhole 51.

After receiving the accept message 513, IP phone A sends a STUN request 514 through pinhole 51 to the STUN server 24. IP phone B receives the STUN request 514 and sends a STUN response 515 through pinhole 52 after optionally verifying the unique identifier 8b. IP phones A and B have verified that they can exchange information and thus media communications 516 may begin.

Figure 6:
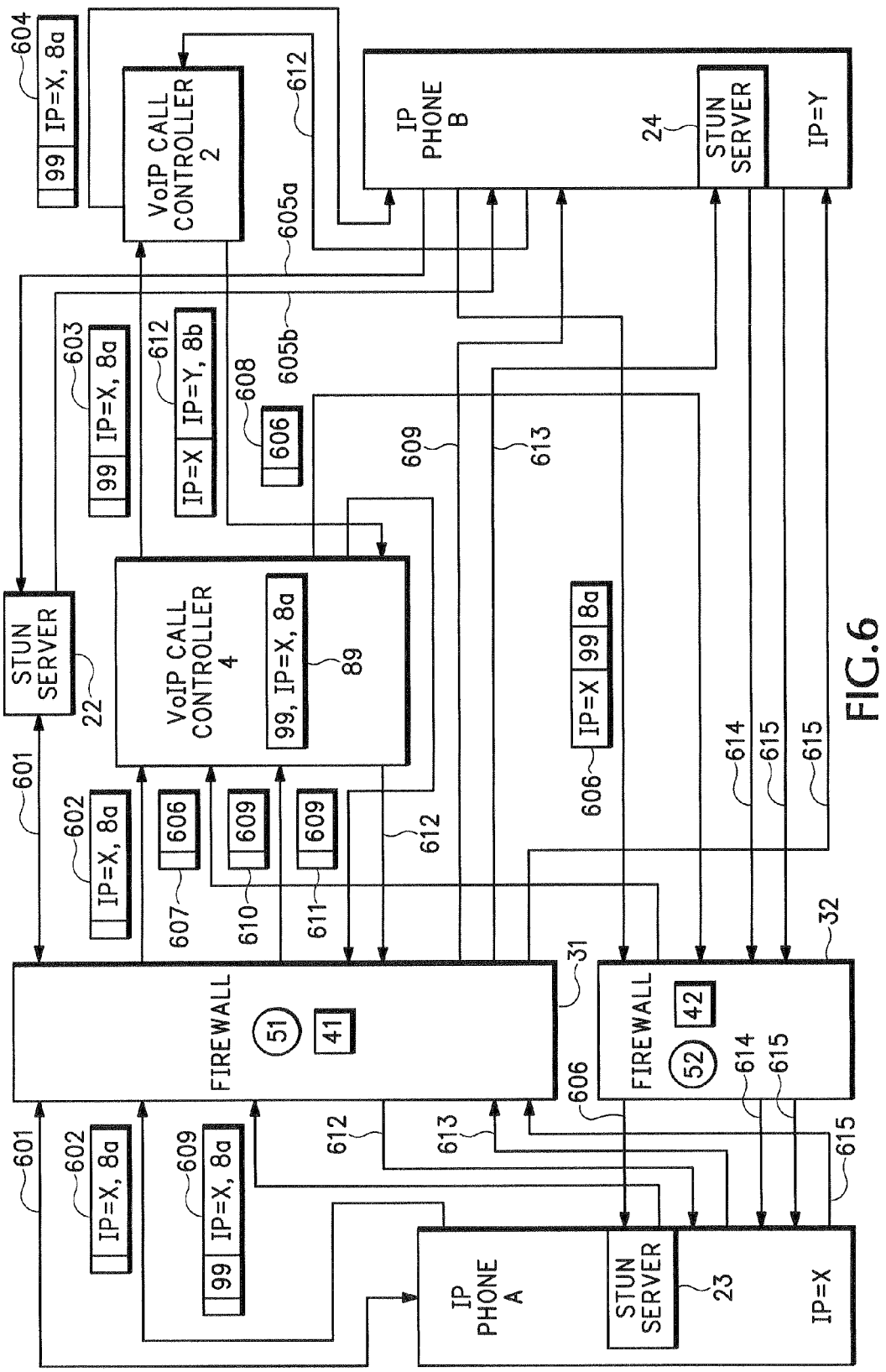
FIG. 6 is a diagram showing a VoIP call controller using session policy to authorize asymmetric restrictive firewalls to forward ICE messages.

Referring now to FIG. 6, an example employing asymmetric firewalls 31 and 32 and opaque tokens 99 is shown. In this example the functions of a firewall controller and a policy server have been optionally incorporated into VoIP call controller 4. Also in this example firewalls 31 and 32 employ restrictive policies; they only allow communications to and from addresses on respective lists 41 and 42.

ICE begins normally with IP phone A making STUN communications 601 with STUN server 22 included on the list 41. IP phone A then makes a local STUN server 23 available on IP address X and associates a unique identifier 8a with that IP address X. Next, IP phone A sends call request 602. Firewall 31 forwards call request 602 to VoIP call controller 4 that is included on list 41.

After receiving call request 602, VoIP call controller 4 adds an opaque token 99 as a header. In the present example token 99 is a 64 bit opaque token 99 that is meaningless to all devices except VoIP call controller 4 and firewalls 31 and 32. The VoIP call controller 4 also examines values of the IP address X and the unique identifier 8a and stores those values along with opaque token 99 in memory 89. Then VoIP call controller 4 sends a communication 603 to the VoIP call controller 2 that includes the opaque token 99.

After IP phone B receives call request 604, IP phone B utilizes any method to determine which IP addresses and port combinations can receive multimedia streams. In this example, IP phone B sends STUN request 605a. IP phone B also sends STUN request 606 to IP phone A. STUN request 606 includes a header with the opaque token 99.

Firewall 32 intercepts the STUN request 606 and examines the opaque token 99. Based on the opaque token 99, firewall 32 determines that VoIP call controller 4 generated the opaque token 99. Firewall 32 then sends an authorization request 607 including the entire STUN request 606 to VoIP call controller 4.

VoIP call controller 4 compares a value of the opaque token 99 located in STUN request 606 to a value stored in memory 89. Policy server 4 also compares a value of the unique identifier 8a located in STUN request 606 to a value stored in memory 89. Since there is a match, VoIP call controller 4 sends an authorization 608 to firewall 32. Authorization 608 may include the entire STUN request 606 to relieve firewall 32 from the burden of storing it during authorization. After receiving the authorization 608, the firewall 32 opens a pinhole 52 and forwards the STUN request 606 to IP phone A.

After receiving STUN request 606, IP phone A sends STUN response 609 to IP phone B, which is intercepted by firewall 31. Firewall 31 then examines the opaque token 99 and determines that it was generated by VoIP call controller 4. Firewall 31 then sends an authorization request 610 containing the entire STUN response 609 to VoIP call controller 4.

After VoIP call controller 4 receives authorization request 610, values of the opaque token 99, the IP address X and/or the unique identifier 8a located in STUN response 609 are compared to values in memory 89. In some examples the VoIP call controller 4 may also compare values of media information 81 (not shown) and a STUN transaction ID 88 (not shown) or any other value. After determining a match, VoIP call controller 4 sends authorization 611 to firewall 31. VoIP call controller 4 may also send STUN response 609 back to firewall 31. Firewall 31 opens pinhole 51 and forwards STUN response 609 to IP phone B.

Meanwhile, IP phone B receives STUN response 605b and then makes a local STUN server 24 available on IP address Y with an associated unique identifier 8b. Also after receiving STUN response 605b, IP phone B sends an accept message 612. The firewall 32 forwards the accept message 612 because it was sent from VoIP call controller 4.

After receiving the accept message 612, IP phone A sends a STUN request 613 through pinhole 51 to the STUN server 24. IP phone B receives the STUN request 613 and sends a STUN response 614 after optionally verifying the unique identifier 8b (not shown). IP phone A has thus verified that it can reach IP phone B at a particular address and visa versa and media communications 615 may begin.

It is noted that private networks frequently include more security devices than the two shown. Only two security devices were shown to simplify the explanation. If a private network is scaled to include many security devices, scaling is simplified by the use of opaque tokens and a central management device storing information in a table.

Figure 7:
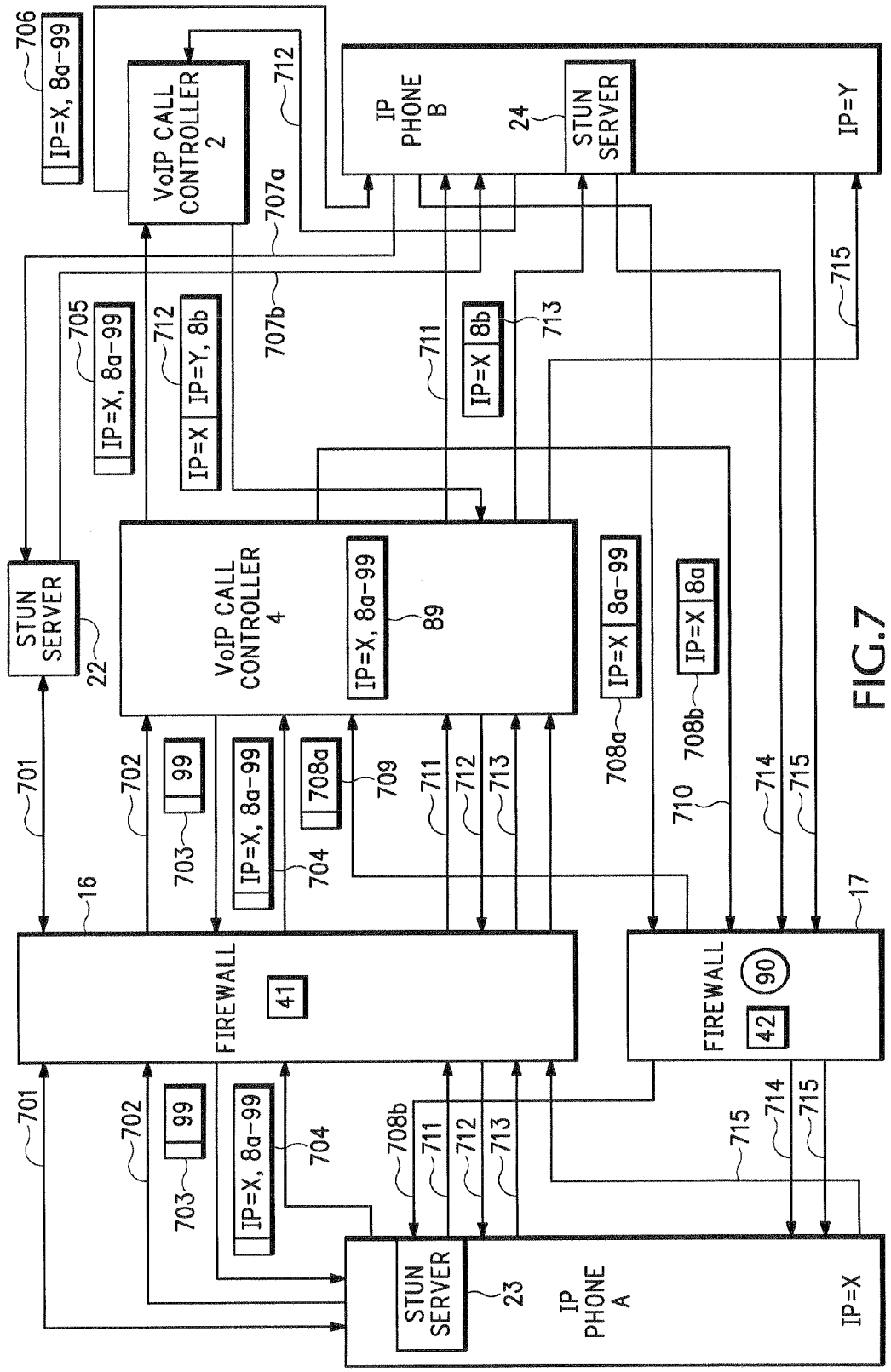
FIG. 7 is a diagram showing an alternative method of using opaque tokens to authorize asymmetric firewalls to forward ICE messages.

Referring now to FIG. 7, an example employing asymmetric firewalls 16 and 17 and opaque token 99 is shown. In this example the opaque token is advantageously prepended or appended to the unique identifier 8a by IP phone A. Also, for simplification, in this example firewalls 16 and 17 employ less restrictive policies; they restrict the flow of inbound communications but generally allow outbound communications.

ICE begins normally with IP phone A making STUN communications 701 with STUN server 22 included on the list 41. IP phone A then makes a local STUN server 23 available on IP address X and associates a unique identifier 8a with that IP address X.

Next, IP phone A sends a communication 702 to VoIP call controller 4 requesting an opaque token value to include with unique identifier 8a. One advantage of IP phone A including the opaque token 99 to the unique identifier is that cryptographic signatures will remain intact. For example, if IP phone A used a cryptographic signature to ensure that a signaling message 704 was not modified, inclusion of the opaque token 99 by the VoIP call controller 4 would break the signature. In response to communication 702, VoIP call controller 4 sends communication 703 including the opaque token 99.

After receiving communication 703, IP phone A prepends or appends the opaque token to the unique identifier 8a. Next, IP phone A sends call request 704 that may include a cryptographic signature.

After receiving call request 704, The VoIP call controller 4 also examines values of the IP address X and the unique identifier 8a including opaque token 99 and stores those values in memory 89. Then VoIP call controller 4 sends a communication 705 to the VoIP call controller 2.

After IP phone B receives call request 706, IP phone B utilizes any method to determine which IP addresses and port combinations can receive multimedia streams. In this example, IP phone B sends STUN request 707a. IP phone B also sends STUN request 708a to IP phone A. STUN request 708a includes the unique identifier 8a including opaque token 99.

Firewall 17 intercepts the STUN request 708a and examines the opaque token 99 included in the unique identifier 8a. Based on the opaque token 99, firewall 17 determines that VoIP call controller 4 generated the opaque token 99. Firewall 17 then sends an authorization request 709 including the entire STUN request 708a to VoIP call controller 4.

VoIP call controller 4 compares a value of the unique identifier 8a including opaque token 99 located in STUN request 708a to a value stored in memory 89. Since there is a match, VoIP call controller 4 strips the opaque token 99 from the unique identifier 8a to create modified STUN request 708b and sends an authorization 710 to firewall 17. After receiving the authorization 710, the firewall 17 opens a pinhole 90 and forwards the modified STUN request 708b to IP phone A.

After receiving STUN request 708b, IP phone A sends STUN response 711 to IP phone B. Meanwhile, IP phone B receives STUN response 707b and then makes a local STUN server 24 available on IP address Y with an associated unique identifier 8b. Also after receiving STUN response 707b, IP phone B sends an accept message 712.

After receiving the accept message 712, IP phone A sends a STUN request 713 to the STUN server 24. IP phone B receives the STUN request 713 and sends a STUN response 714 after optionally verifying the unique identifier 8b. IP phone A has thus verified that it can reach IP phone B at a particular address and visa versa and media communications 715 may begin.

It is noted that many variations of the above process may be used. For example, VoIP call controller may prepend or append the opaque 99 token to the unique identifier 8a. Also, firewall 17 or IP phone A may later strip the opaque token 99 from unique identifier 8a.

Figure 8:
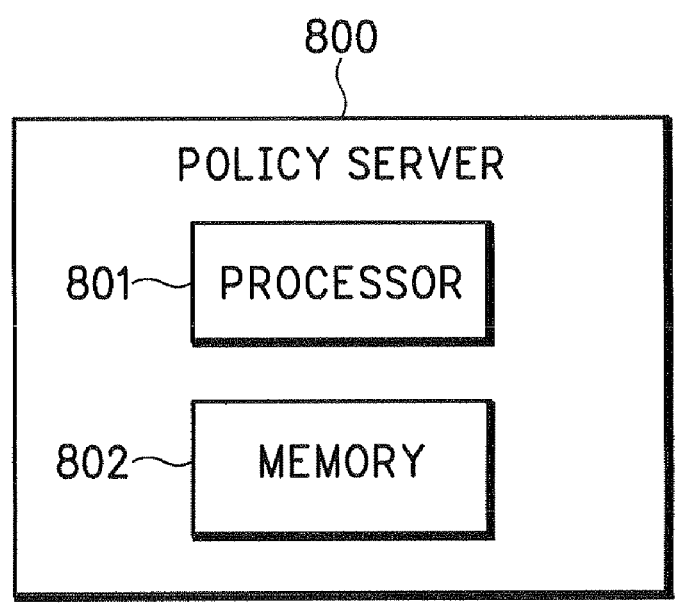
FIG. 8 is a diagram of the policy server shown in FIGS. 3A and 3B.

FIG. 8 shows a policy server 800 that authorizes ICE messages. The policy server 800 includes a processor 801 and a memory 802. The memory 802 includes instructions that, when executed by the processor 801, perform the functions described in the flowcharts of FIG. 9.

Figure 9:
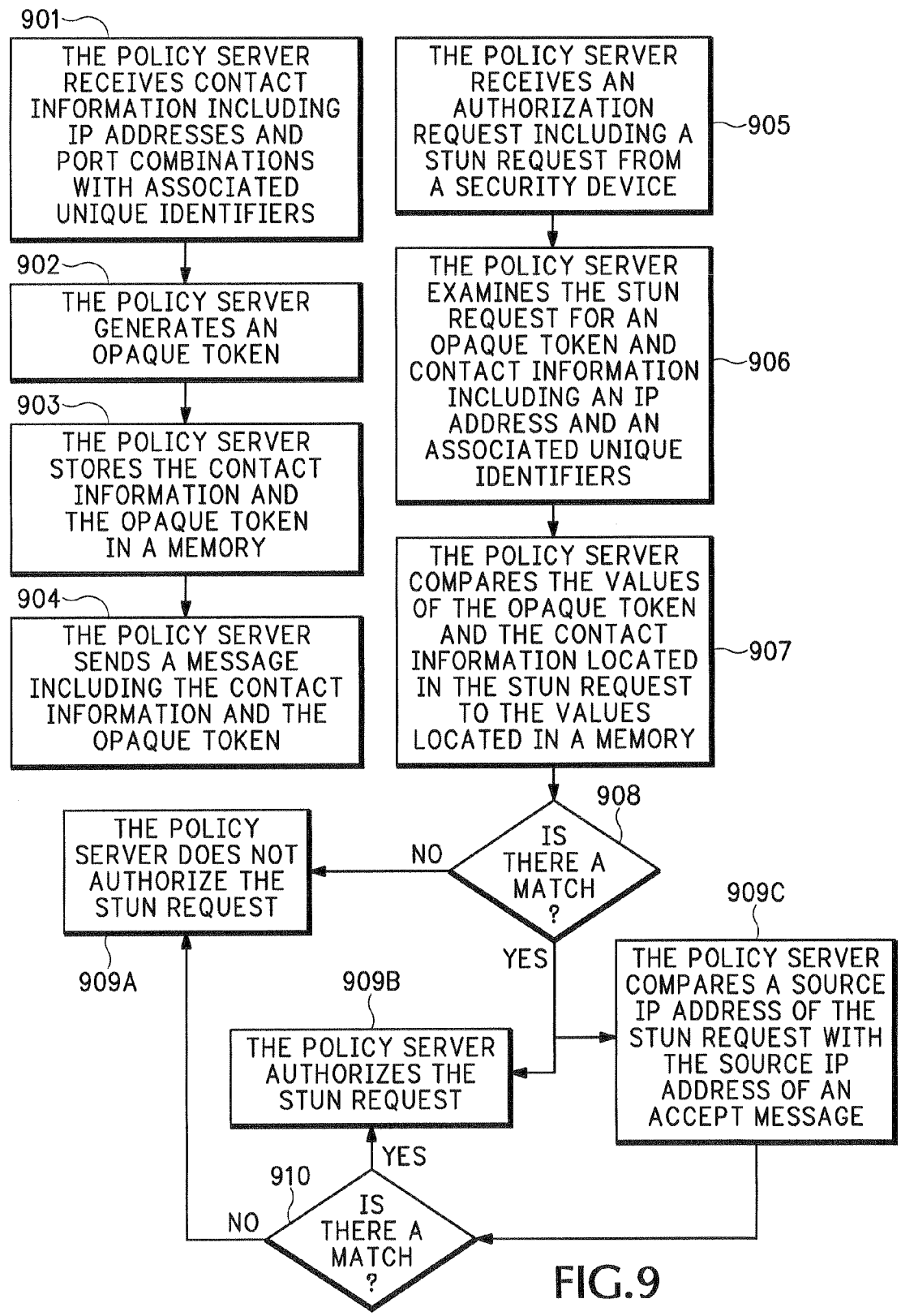
FIG. 9 is a flowchart showing how the policy server authorizes the forwarding of ICE messages.

Referring to FIG. 9, the policy server 800 in block 901 receives contact information from a security device such as a firewall or NAT. The contact information includes a list of IP addresses and port combinations with associated unique identifiers. The policy server 800 generates an opaque token in block 902. In block 903, the policy server 800 stores the contact information and the opaque token in a memory 802. In block 904, the policy server 800 sends a message including the contact information and the opaque token.

Later in block 905, the policy server 800 receives an authorization request including a STUN request from a security device. In block 906 the policy server examines the STUN request for an opaque token and contact information. Next in block 907 the policy server 800 compares the values of the opaque token and contact information located in the STUN request to the values in the memory 802. If there is not a match in block 908, the policy server 800 does not authorize the STUN request in block 909A.

If there is a match in block 908, the policy server 800 may authorize the STUN request in block 909B. Alternatively, in block 909C the policy server 800 compares the source IP address of the STUN request with a source IP address of a received accept message. After finding a match in block 910, the policy server 800 authorizes the STUN request.

Referring now to FIGS. 10 and 11, a firewall 1000 that has a restrictive policy and is still compatible with ICE is shown. The firewall 1000 may also be a restrictive NAT 1000 or other security device 1000. The firewall 1000 includes a processor 1001 and a memory 1002. The memory 1002 includes instructions that, when executed by a processor, perform functions described in the flowchart of FIG. 11.

Referring to FIG. 11, in block 1101 the firewall 1000 receives an unauthorized ICE message including a STUN request. The firewall 1000 inspects the STUN request in block 1102. In block 1103 the firewall 1000 discovers and examines an opaque token that was generated by a policy server. In block 1104, the firewall 1000 forwards the entire STUN request to the policy server thereby requesting authorization.

If authorization is received in block 1105, the firewall 1000 in block 1106A forwards the STUN request and monitors for a non-error STUN response with a same STUN transaction ID. If the non-error STUN response is received in block 1107, the firewall 1000 opens a pinhole in block 1108A. If the non-error response is not received in block 1107, the firewall 1000 does not open a pinhole in block 1108B. Finally, if authorization was never received in block 1105, the firewall 1000 drops the ICE message in block 1106B.

Figure 12:
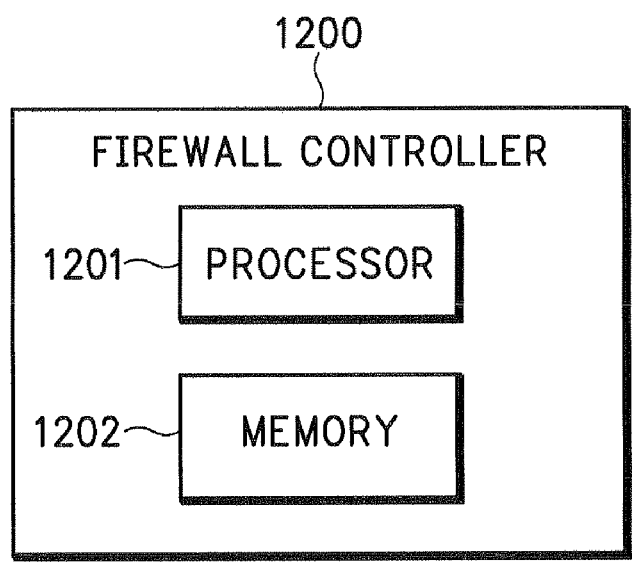
FIG. 12 is a diagram of the firewall controller shown in FIG. 5.
Figure 13:
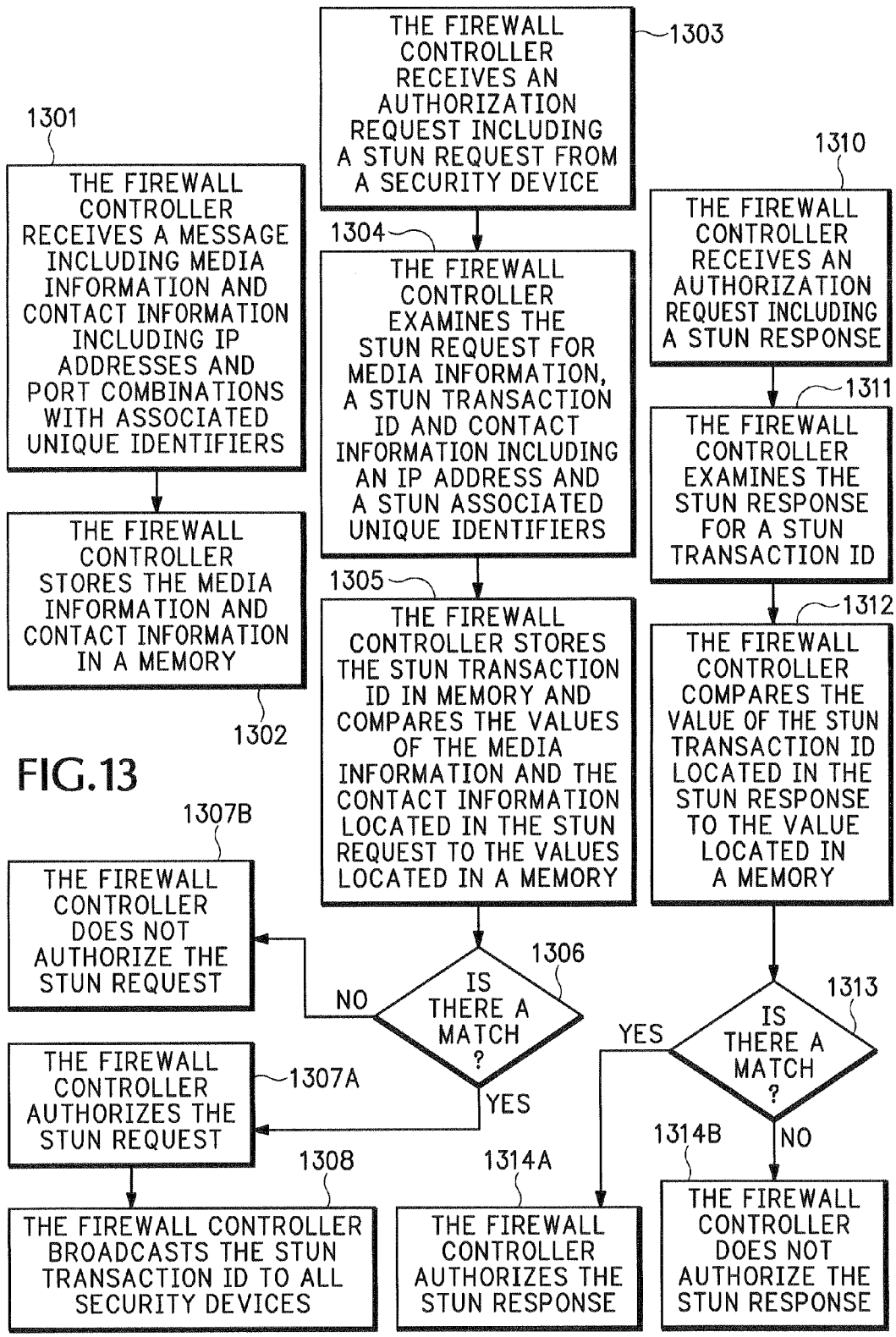
FIG. 13 is a flowchart showing how the firewall controller authorizes the forwarding of ICE messages.

Referring now to FIGS. 12 and 13, a firewall controller 1200 that makes ICE compatible with asymmetric security devices such as firewalls is shown. The firewall control 1200 may also be a policy server 1200 or any other management device 1200. The firewall controller 1200 includes a processor 1201 and a memory 1202. The memory 1202 includes instructions that, when executed by a processor, perform functions described in the flowchart of FIG. 13.

Referring to FIG. 13, in block 1301 the firewall controller 1200 receives a message including media information and contact information including a list of IP address and port combinations with associated unique identifiers. The firewall controller 1200 then stores the media information and the contact information in the memory 1202 in block 1302.

Later, in block 1303 the firewall controller 1200 receives an authorization request including a STUN request from a security device. In block 1304 the firewall controller 1200 examines the STUN request for media information, a STUN transaction ID and contact information including a list of IP address and port combinations with associated unique identifiers. In block 1305 the firewall controller 1200 stores the STUN transaction ID in memory 1202 and compares values of the media information and the contact information located in the STUN request to the values located in the memory 1202.

If there is a match in block 1306, the firewall controller authorizes a STUN request in block 1307A. The firewall controller 1200 may also broadcast the STUN transaction ID to all security devices in block 1308. If instead there is not a match in block 1306, the firewall controller 1200 does not authorize the STUN request in block 1307B.

Later in block 1310 the firewall controller 1200 receives an authorization request including a STUN response from a security device. In block 1311 the firewall controller 1200 examines the STUN response for a STUN transaction ID. In block 1312 the firewall controller 1200 then compares a value of the STUN transaction ID located in the STUN response to the value located in the memory 1202. If there is a match in block 1313, the firewall controller 1200 authorizes the STUN response in block 1314A. If there is not a match in block 1313, the firewall controller 1200 does not authorize the STUN response in block 1314B.

Figure 14:
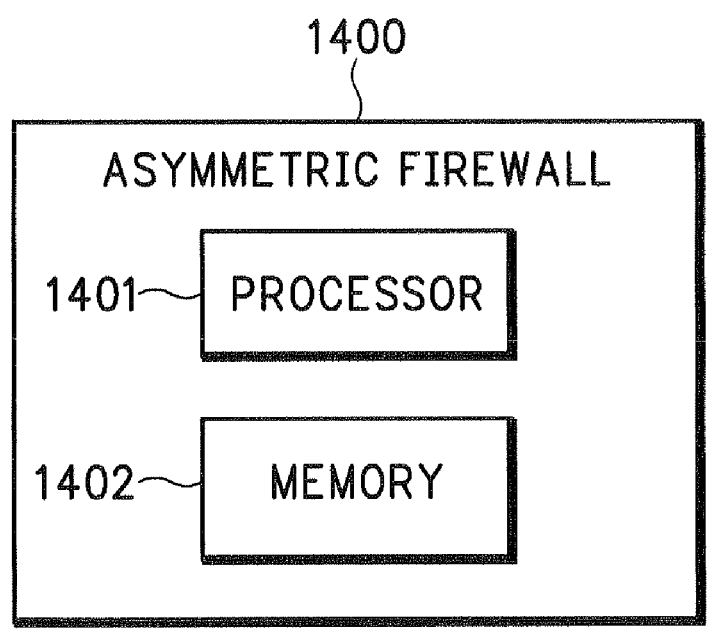
FIG. 14 is a diagram of the asymmetric firewalls shown in FIG. 5.
Figure 15:
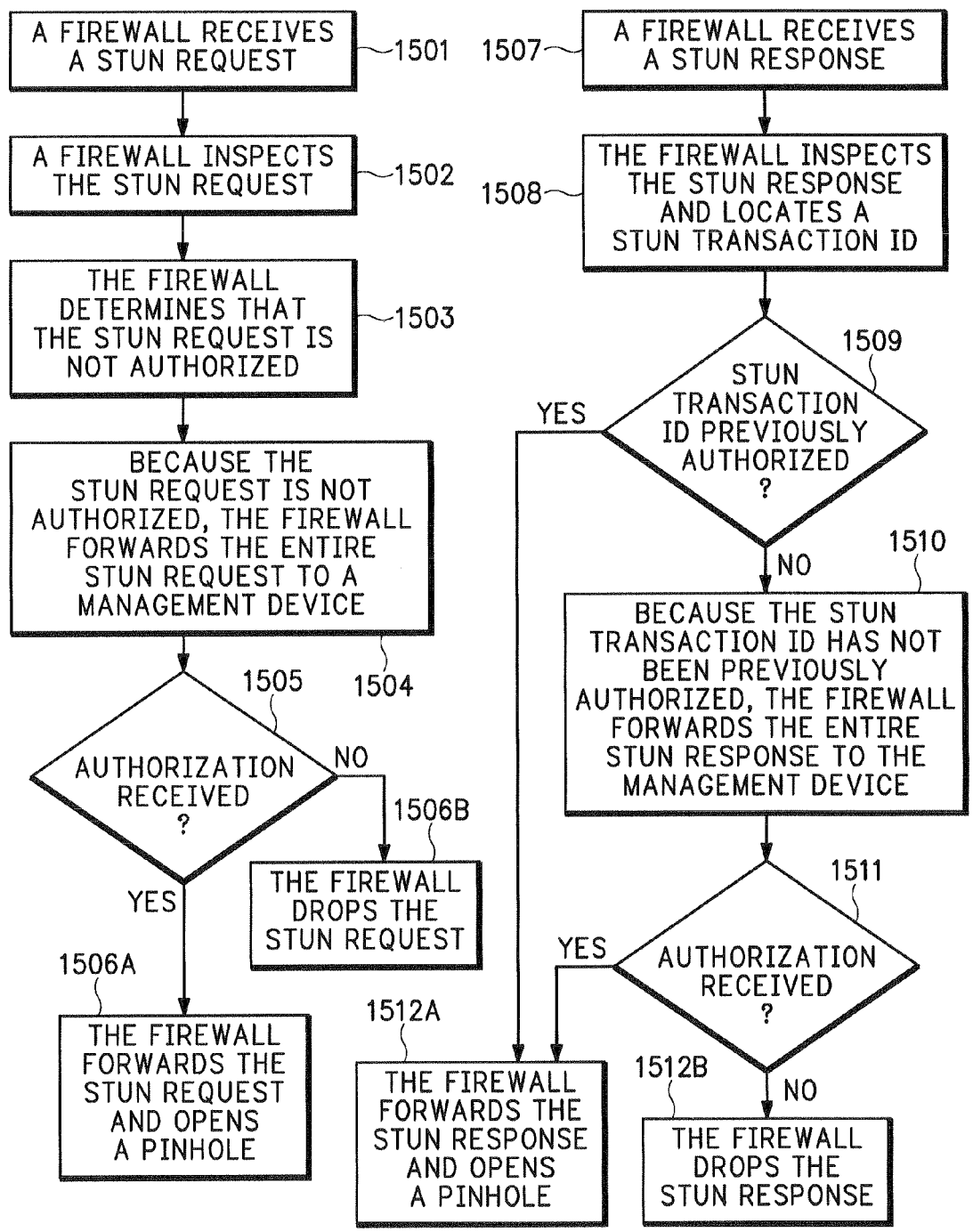
FIG. 15 is a flowchart showing how the asymmetric firewalls receive authorization to forward ICE messages.

Referring now to FIGS. 14 and 15, an asymmetric firewall 1400 that is compatible with ICE is shown. The firewall 1400 may also be any other security device 1400. The firewall 1400 includes a processor 1401 and a memory 1402. The memory 1402 includes instructions that, when executed by a processor, perform functions described in the flowchart of FIG. 15.

Referring now to FIG. 15, in block 1501 a firewall 1400 receives a STUN request. The firewall 1400 inspects the STUN request in block 1502. The firewall 1400 determines that the STUN request is not authorized in block 1503. Accordingly, in block 1504 the firewall 1400 forwards the entire STUN request to a management device. If authorization is received in block 1505, the firewall 1400 forwards the STUN request and opens a pinhole in block 1506A. If authorization is not received in block 1505, the firewall drops the STUN request in block 1506B.

Later another firewall 1400 may receive a STUN response in block 1507. The firewall 1400 inspects the STUN response and locates a STUN transaction ID in block 1508. In block 1509, if the firewall 1400 has previously received authorization for the STUN transaction ID from a broadcast by the management device or by another firewall, then the firewall 1400 forwards the STUN request and opens a pinhole in block 1512A.

If the STUN transaction has not been previously authorized in block 1509, the firewall 1400 forwards the entire STUN response to a management device. If authorization is received in block 1511, the firewall 1400 forwards the STUN response and opens a pinhole in block 1512A. If authorization is not received in block 1511, the firewall 1400 drops the STUN response in block 1512B.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A management system, comprising:
    a processor generating a token to be inserted into a signaling message and then comparing the token with an unauthorized message received at a security device to authorize forwarding by the security device; and
    the processor receiving an authorization request including an entire Simple Traversal of User Datagram Protocol (UDP) Through Network Address Translators (STUN) request that includes the token and the processor removing the token and sending the entire tokenless STUN request back to the security device.

2. The management system of claim 1 wherein the unauthorized message is an Interactive Connectivity Establishment (ICE) message.

3. The management system according to claim 1 wherein the processor further compares contact information included in the signaling message to contact information included in the unauthorized message.

4. The management system according to claim 1, wherein the processor operates in a policy server or a firewall controller.

5. The management system according to claim 4 wherein an authorization is sent by the processor to a firewall, a NAT, or any other security device.

6. A security system comprising: a processor sending an authorization request for an unauthorized message, the unauthorized message including an authorization token; and forwarding the unauthorized message when the authorization request is validated; and where the processor opens a pinhole when a validation message is received back in response to the forwarded unauthorized message; wherein the pinhole is a path through a security device through which messages associated with a particular source address may pass.

7. The security system of claim 6, where the authorization request includes the authorization token to be used for validation.

8. The security system of claim 6 further comprising the processor multicasting a Simple Traversal of User Datagram Protocol (UDP) Through Network Address Translators (STUN) transaction identifier to other security devices in a same multicast group.

9. The security system of claim 6 wherein the unauthorized message is an Interactive Connectivity Establishment (ICE) message including a STUN request.

10. The security system of claim 6 wherein opening the pinhole further includes comparing a STUN transaction identifier included in the unauthorized message with a STUN transaction identifier included in the validation message.

11. A method for authorizing communications across asymmetric security devices comprising:
    receiving a first message that includes first media information associated with an outgoing communication, the first message sent from a first asymmetric security device processing the outgoing communication;
    storing the first media information;
    receiving a first authorization request from a second different asymmetric security device, the first authorization request including second media information associated with an unauthorized incoming communication;
    comparing a first value from the first media information to a second value from the second media information; and
    authorizing the second different asymmetric security device to forward the unauthorized incoming communication according to the comparison.

12. The method of claim 11 including storing a Simple Traversal of User Datagram Protocol (UDP) Through Network Address Translators (STUN) transaction identifier located in the first authorization request.

13. The method of claim 12 including sending the STUN transaction identifier to a first asymmetric security device.

14. The method of claim 11 further comprising:
    receiving a second authorization request associated with an unauthorized outgoing communication received at a first asymmetric security device and comparing a value of a STUN transaction identifier located in the second authorization request to the stored value;
    authorizing the first asymmetric security device to forward the unauthorized outgoing communication according to the comparison.

15. The method of claim 11 where the unauthorized incoming communication is an Interactive Connectivity Establishment (ICE) message.

16. A method comprising:
    identifying an outgoing message containing a payload having a unique identifier;
    attaching an opaque token to the unique identifier before communicating the outgoing message, the opaque token to be used for verifying an incoming message at a security device, said attachment to cause a remote endpoint originating a communication that contains the unique identifier to automatically include the opaque token therein independently of whether the remote endpoint is aware of the presence of the opaque token;
    receiving at the security device the incoming message having a payload containing the unique identifier, the unique identifier having the opaque token attached thereto;
    sending a verification message including the opaque token, the verification message sent from the security device to a management device; and
    communicating the incoming message if authorization is received for the incoming message.

17. The method of claim 16 wherein the verification message includes an entire Simple Traversal of User Datagram Protocol (UDP) Through Network Address Translators (STUN) request.

18. The method of claim 17 wherein the verification message is sent responsive to the security device observing the presence of the opaque token in the incoming message.

19. The method of claim 18 including:
receiving an unauthorized outgoing communication after communicating the incoming message; and
sending an authorization request to the management device to determine whether to forward the unauthorized outgoing communication.

20. A system for authorizing communications across asymmetric security devices comprising:
means for receiving a first message that includes first media information associated with an outgoing communication;
means for storing the first media information;
means for receiving a first authorization request from a first asymmetric security device, the first authorization request including second media information associated with an unauthorized incoming communication;
means for comparing a first value from the first media information to a second value from the second media information; and
means for authorizing the first asymmetric security device to forward the unauthorized incoming communication according to the comparison.

21. The system of claim 20 including means for storing a Simple Traversal of User Datagram Protocol (UDP) Through Network Address Translators (STUN) transaction identifier located in the first authorization request.

22. The system of claim 20 further comprising:
means for receiving a second authorization request associated with an unauthorized outgoing communication received at a second asymmetric security device and comparing a value of a STUN transaction identifier located in the second authorization request to the stored value;
means for authorizing the second asymmetric security device to forward the unauthorized outgoing communication according to the comparison.

23. The system of claim 20 where the unauthorized incoming communication is an Interactive Connectivity Establishment (ICE) message.

24. The system of claim 20 wherein the first message is received at a call controller.

25. The system of claim 20 including
means for receiving an unauthorized outgoing communication after forwarding the first message; and
means for sending an authorization request to determine whether to drop or forward the unauthorized outgoing communication.

* * * * *